United States Patent [19]

Matsuda et al.

[11] Patent Number: 5,480,022
[45] Date of Patent: Jan. 2, 1996

[54] ROLLER OF VARIABLE OUTER DIAMETER TYPE, AND CARRYING APPARATUS AND METHOD USING THE SAME

[75] Inventors: Yutaka Matsuda, Kuala Lumpur, Malaysia; Kaoru Shimizu, Osaka, Japan

[73] Assignee: Matsushita Electric Industrial Co., Ltd., Osaka, Japan

[21] Appl. No.: 331,734

[22] Filed: Oct. 31, 1994

Related U.S. Application Data

[62] Division of Ser. No. 151,211, Nov. 12, 1993, Pat. No. 5,407,054.

[30] Foreign Application Priority Data

Apr. 21, 1993 [JP] Japan .................... 5-094423
Jul. 28, 1993 [JP] Japan .................... 5-186037

[51] Int. Cl.$^6$ .................... B65G 13/12
[52] U.S. Cl. .............. 198/782; 193/35 SS; 198/370.09
[58] Field of Search .................... 198/365, 372, 198/780, 781, 782; 193/35 SS; 492/4

[56] References Cited

U.S. PATENT DOCUMENTS

| | | | |
|---|---|---|---|
| 4,593,810 | 6/1986 | Cook | 198/782 X |
| 4,598,815 | 7/1986 | Adama | 198/782 X |
| 4,656,709 | 4/1987 | Mingers et al. | 492/4 |
| 4,730,718 | 3/1988 | Fazio et al. | 198/372 |
| 4,746,003 | 5/1988 | Yu et al. | 198/372 X |
| 4,747,477 | 5/1988 | Benz et al. | 198/372 X |
| 4,817,410 | 4/1989 | Yatsuzuka et al. | 492/4 X |
| 4,962,841 | 10/1990 | Kloostorhouse | 198/372 |
| 5,161,672 | 11/1992 | Fukuyama | 198/782 X |

FOREIGN PATENT DOCUMENTS

| | | | |
|---|---|---|---|
| 0474104 | 6/1951 | Canada | 198/782 |
| 3045563 | 7/1982 | Germany | 198/782 |
| 1242309A | 9/1989 | Japan . | |
| 320420A | 1/1991 | Japan . | |
| 3259843A | 11/1991 | Japan . | |
| 1203629 | 8/1970 | United Kingdom | 492/4 |

*Primary Examiner*—James R. Bidwell
*Attorney, Agent, or Firm*—Stevens, Davis, Miller & Mosher

[57] ABSTRACT

A roller of variable outer diameter type has a holding member having a plurality of through holes radially along a side surface and provided with a hollow portion communicating with these through holes; a sealing member having diaphragms arranged so as to correspond to the respective through holes; and sliders respectively fitted slidably in the through holes and forming an outer peripheral surface of the roller, the sealing member causing the sliders to urge and displace the sliders via the diaphragms by a fluid supplied thereinto in such a direction that the outer diameter of the roller is enlarged. This roller of variable outer diameter type is mounted on a rotary shaft portion in an apparatus for transferring articles such as a transporting conveyer or the like.

11 Claims, 13 Drawing Sheets

ROLLER OF VARIABLE OUTER DIAMETER TYPE, AND CARRYING APPARATUS AND METHOD USING THE SAME

This is a division of application Ser. No. 08/151,211 filed Nov. 12, 1993, now U.S. Pat. No. 5,407,054.

BACKGROUND OF THE INVENTION

1. Field of the Invention

This invention relates to a roller of variable outer diameter type, and a transferring apparatus and method using the same. More particularly, it relates to a transferring apparatus and method for shifting articles transported by using rollers of variable outer diameter type, the transferring apparatus including a conveyer apparatus having such rollers of variable outer diameter type mounted on a shaft driven by a motor to transport an article, and other conveyer means, for example a belt conveyer, a chain conveyer or a roller conveyer (including one having rollers having a smaller outer diameter), arranged in the vicinity of a conveyer apparatus using such rollers of variable outer diameter type.

2. Description of the Related Art

A roller of variable outer diameter type used to vary the size of an outer diameter of a roller by using a fluid such as a compressed air, has been proposed, for example, in Japanese Patent Application Unexamined Publication Nos. 3-20420 and 3-259843 in which an elastic cylindrical pressure chamber (including a combination of a plurality of pressure chambers) secured to a rotary shaft(s) is supplied with compressed air to cause the cylindrical elastic body to expand to thus vary its diameter. Also, in shifting articles from one to another, an actuator such as a cylinder using air or hydraulic pressure may be interposed.

However, all of the above-mentioned devices have an elastic cylindrical body expanded by pressure of a fluid supplied thereinto so as to change the outer diameter size of the elastic cylindrical body. Typically, the pressure of compressed air supplied under centralized control in a factory is in a range of from about 4.5 Kgf/cm$^2$ to about 8.5 Kgf/cm$^2$ and hence widely varies in the pressure range to be unstable.

In the case of the above conventional roller, when the ratio of the outer diameter size of an elastic cylindrical body in the expansion state thereof to that in the normal state thereof is large (i.e. the coefficient of expansion being large), even if it is formed of a flexible elastic body such as a rubber, it is highly probable that the repetition of expansion, accompanying with an elastic strain of more than 50%, in excess of 200,000 times will cause its fatigue fracture due to the tension thereof. It is extremely difficult to obtain elastic material at low cost in order to meet this problem.

When high pressure fluid, for example, a high pressure compressed air of about 5.5 kgf/cm$^2$ or more, is used to transport heavy load articles, the tension in the circumferential direction of the cylindrical elastic body at the time of expansion in the above conventional devices is extremely enlarged. Rubber or other elastic materials restricts the structure and the fatigue-resistance factor so that their use is made extremely difficult.

It is also noted in the conventional cylindrical elastic body that the outer diameter size thereof changes in accordance with the changing of the inner pressure thereof. Accordingly, in order to make the outer diameter size thereof constant at the time of the expansion, it is necessary to control the supplied fluid pressure with high accuracy. As a result, the structure becomes complicated, and further an expensive, high-performance pressure sensor and pressure control unit are required. Further, inasmuch as transported articles may have varied bottom configurations and may have metallic members with acute projections, there is an undesirable high possibility that when such portions with acute projections make direct contact with the cylindrical elastic body made of rubber member, a fracture of the latter is caused in a short period of time.

Moreover, a carrying apparatus in which an actuator is interposed is complicated in structure and high in cost, and requires a prolonged time period in a shifting operation.

SUMMARY OF THE INVENTION

This invention resolves the foregoing problems, and the object of the invention is to provide a roller of variable outer diameter type which is simple in construction and less expensive in assembling, and a transferring apparatus and transferring method utilizing that roller.

In order to resolve the foregoing problems, a roller of variable outer diameter type according to the invention comprises a holding member having a plurality of through holes radially arranged along a side surface thereof and provided with a hollow portion communicating with these through holes; a sealing member having diaphragms arranged so as to correspond to the respective through holes; and sliders respectively fitted slidably in the through holes and forming an outer peripheral surface of the roller, the sliders being urged and displaced via the diaphragm by means of a fluid supplied in the sealing member in such a direction that the outer diameter size of the roller is enlarged.

More specifically, the roller of the variable outer diameter type has a pipe formed with a plurality of through holes along a cylindrical surface thereof, a sealing member fittedly mounted inside the pipe and having pot-like-shaped diaphragms therein so as to correspond to each of the through holes, sliders slidably fitted in each of the through holes and forming an outer peripheral surface of the roller, the sealing member and the pipe being hermetically clamped by means of a rotary shaft provided with an opening for fluid supply and for urging the diagrams and side plates disposed at both sides of the end surfaces of the said pipe, and the sliders being urged and displaced via the diaphragms by fluid, e.g., compressed air, supplied from a rotary-type joint connected to the rotary shaft in such a direction that the outer diameter size of the roller is enlarged.

Stated otherwise, a plurality of elastic diaphragms disposed along the inner wall surface of the closed pipe are urged by the fluid supplied through the opening of the rotary shaft.

As a consequence, the respective sliders passing through the holes formed along the cylindrical side surface of the pipe and inserted in the pot-like diaphragm are urged out of the pipe. Also, an arc portion forming an outer peripheral surface of the roller and located at a head portion of each slider is displaced at a predetermined dimension so that the roller diameter is enlarged to form a desired outer periphery surface of the roller (outer diameter side).

Thus, the projecting portion (differential portions in level) of each slider is abutted against each side plate to restrict the operating range thereof.

After finishing the transfer of articles between the transporting conveyers, the compressed air inside the pipe is discharged and the sliders are returned, by the tension of a rubber ring disposed in a groove of the outer peripheral surface of the roller, to the original position while urging the diaphragm. As a result, the above arc portion of each slider forms an outer peripheral surface (outer diameter size) of an original small roller.

A conveyer apparatus according to the present invention is provided with the above-mentioned rollers of variable outer diameter type at both end portions of a shaft and with a plurality of rotary shaft means driven by a motor.

Further, an apparatus for transferring articles is provided with the rollers of variable outer diameter type at both end portions of a shaft, a plurality of rotary shaft means driven by a motor, and conveyer means disposed in the vicinity of the rotary shaft means.

By virtue of the foregoing construction, the present invention makes the construction of a roller and a conveyer apparatus using the roller extremely simple.

Moreover, excessive tension is not applied on a diaphragm included in the roller of variable outer diameter type. When the diaphragm is deformed from the pot-like-shape into a planar shape, only a slight compression and a slight pending strain are generated.

Accordingly, even if a repetitive operation exceeding 2,000,000 times or compressed air of a pressure exceeding 5 Kgf/cm² is applied to the roller according to the present invention, it does not cause a fatigue fracture.

In addition, since the operating range of the sliders is restricted by the side plates, the maximum outer diameter size of the roller that the sliders form is always made constant, regardless of the magnitude of the fluid pressure applied to the diaphragms.

Furthermore, as the bottom-surfaces of transported articles are in contact with a head portion of the slider so that diaphragms made of an elastic material or the like are not in direct contact therewith, there is no possibility that it is separated or broken due to a hard projection or the like of the bottom surface of the transported article.

DETAILED DESCRIPTION OF THE PREFERRED EMBODIMENTS

Example 1

Figure 1:
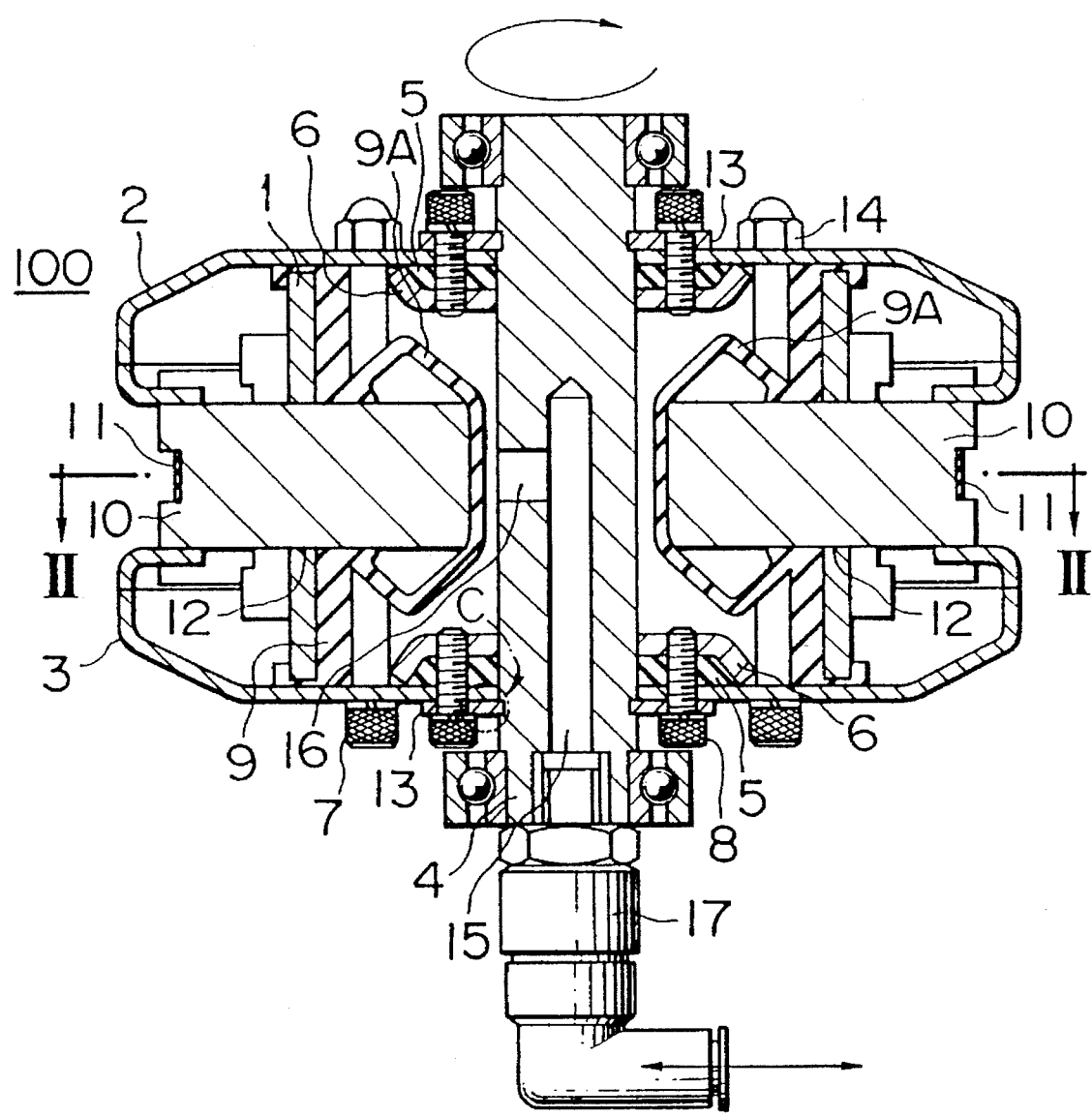
FIG. 1 is a longitudinal-sectional view of a roller of variable outer diameter type according to one embodiment of the present invention.
Figure 2:
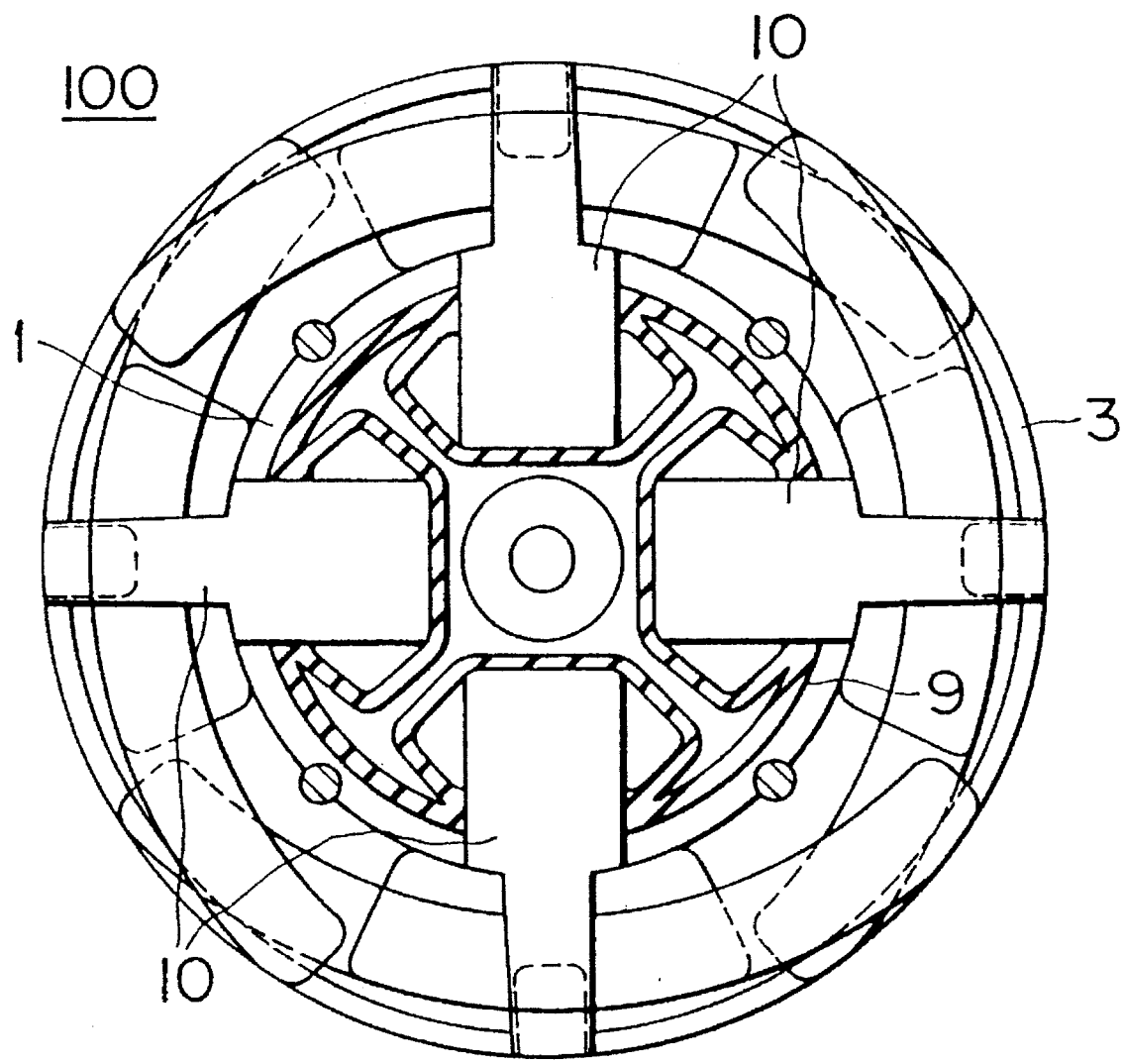
FIG. 2 is a cross-sectional view taken along the line II—II of FIG. 1.

A roller of variable outer diameter type in one embodiment of the present invention will first be described with reference to FIG. 1 through FIG. 8. In FIGS. 1 and 2, a pipe 1 is made of a metallic material or a hard material such as epoxy resin or FRP (fiber-reinforced plastic) resin. Also, the pipe 1 has a plurality of through holes 12 radially formed along a cylindrical surface thereof, e.g. four (4) through holes located at every 90 degrees thereon.

The pipe 1 is also worked by continuous machining of a metallic pipe with a NC (numerically controlled) lathe, or injection molding of an above-mentioned resin material.

Further, the pipe 1 is held via the edge portions 9C of a sealing member 9 between side plates 2 and 3 from both sides thereof.

The side plates 2 and 3 each are in the form of a disk having an end portion thereof bent so as to provide generally a U-shaped cross section.

The side plates 2 and 3 are formed typically by press-machining metallic plates but may each be made alternatively by injection-molding a resin material such as FRP (e.g. glass fiber-reinforced plastic).

A roller shaft 4 and the side plates 2 and 3, arranged coaxially with the pipe 1, are hermetically sealed and fastened each other with disk-shaped rubber gaskets 5, disk-shaped gasket stops 6 and bolts 8.

The state of mounting rectangular rotation stop plates 13 is illustrated by the arrow C in FIG. 1. The rotation stop plates 13 are fittedly inserted at two pairs of positions or totaled four positions in H-cut groove portions of the roller shaft 4 (portions generally oval-shaped in cross-section of the roller shaft 4 as not shown), respectively, perpendicularly to the sheet of drawing of FIG. 1 and are secured, together with the disk-shaped rubber gasket stops 6, to the side plates 2 and 3 by means of the bolts 8.

Depending on the fastening strength of the bolts 8, the disk-shaped rubber gaskets 5 protrude in the direction of urging the roller shaft 4 from the outer periphery thereof so as to perform a sealing function. Accordingly, surface-finish machining for the roller shaft 4 is made unnecessary, and sufficient sealing can be maintained with a rough surface thereof as it is when a steel material is just drawn.

The side plates 2 and 3 and the pipe 1 are completely sealed and fastened hermetically with the edge portions 9C of the sealing member 9, bolts 7 and nuts 14.

Figure 5:
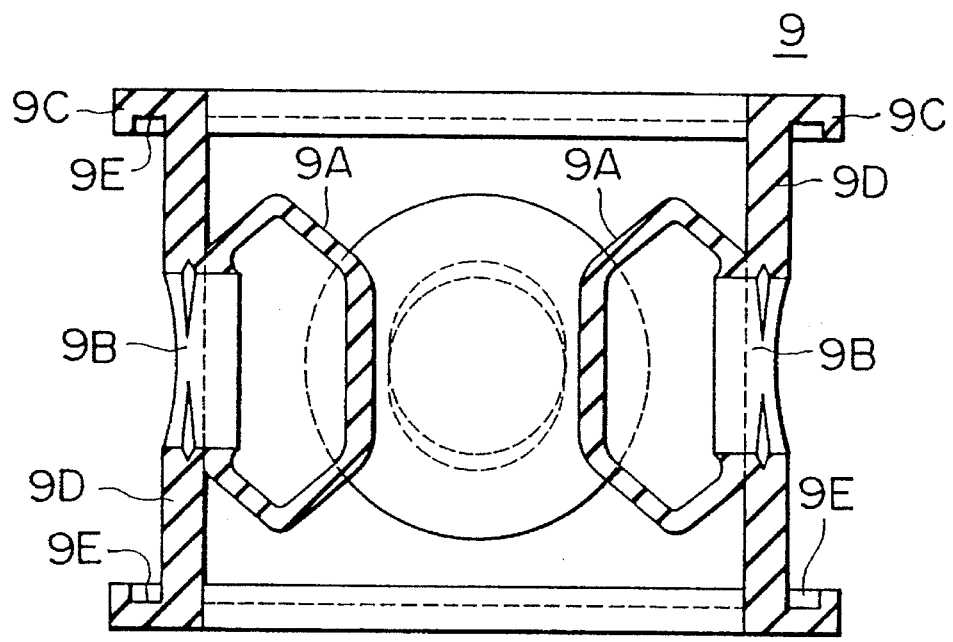
FIG. 5 is a longitudinal-sectional view of a sealing member included in the roller of variable outer diameter of FIG. 1.

The afore-mentioned sealing member 9, as shown in FIG. 5, is provided by integrally forming an elastic material such as, for example, silicon rubber, butyl rubber or a soft plastic material. The method of forming it may be selected optionally from any integral forming method including casting and injection-molding.

The sealing member 9 is fittedly mounted inside the pipe 1.

Figure 6:
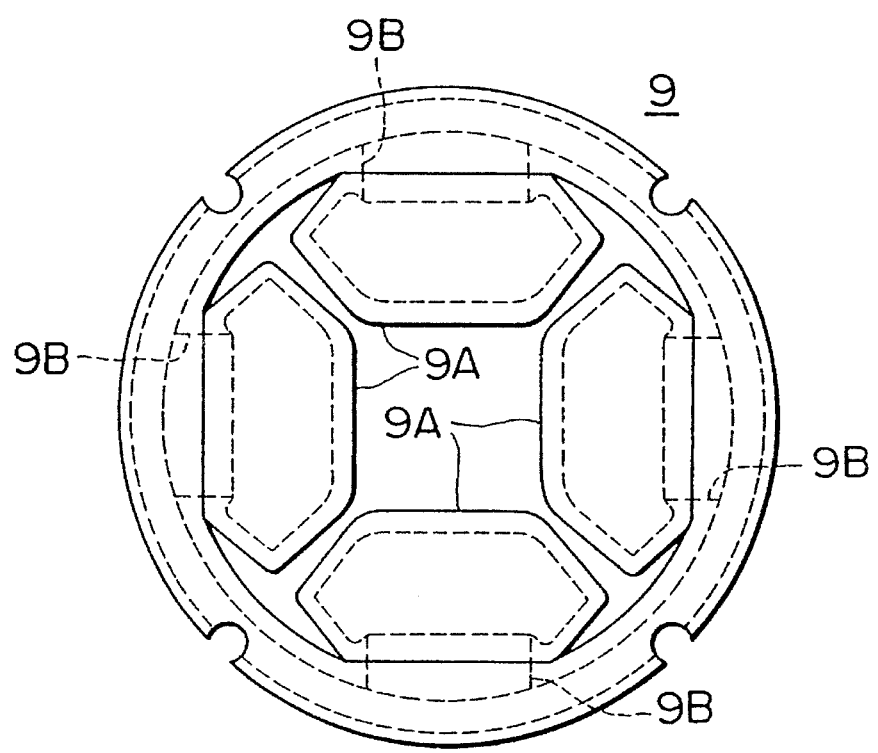
FIG. 6 is a plan view of the sealing member of FIG. 5.

The sealing member 9, whose configuration is shown in FIGS. 5 and 6, includes a cylindrical body portion 9D, through holes 9B, diaphragms 9A, edge portions 9C and annular grooves 9E.

The through holes 9B, four in number, are provided at four positions corresponding to the four through holes 12 provided in the aforementioned pipe 1, respectively, and cause supporting shaft portions 10A of the sliders 10 as mentioned later to be slidably fitted therein.

The diaphragms 9A are also provided at four positions corresponding, respectively, to the four through holes formed in the cylindrical side surface of the afore-mentioned pipe 1. And they each are formed with a convexity (pot-like shape) projecting internally of the cylindrical body portion 9D.

The annular recess 9E and the flange-like edge portions 9C located at the end portions of the pipe 1 enable the side plates 2 and 3 and the pipe 1 to be hermetically sealed by fastening the bolts 7 and the nuts 14.

Incidentally, it is needless to say that the pot-like shaped diaphragms 9A of the sealing member 9 may be bellows-like or be formed to have a polyhedron or any optional shape.

As is apparent from FIG. 1, the through holes 12 of the pipe 1 in which the sliders 10 are fitted are hermetically sealed by the diaphragms 9A of the sealing member 9.

Figure 7:
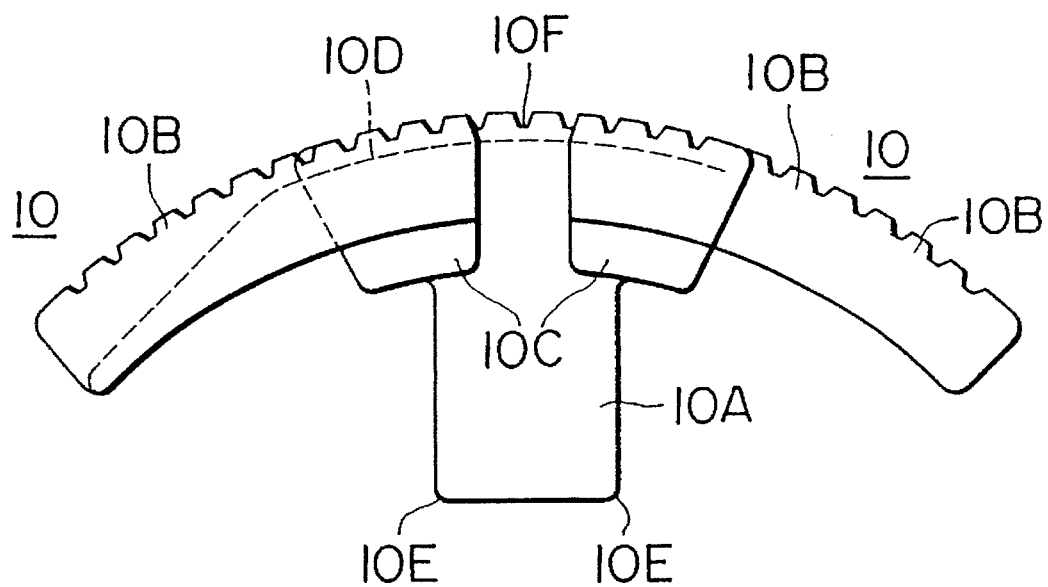
FIG. 7 is an elevational view of a slider included in the roller of variable outer diameter type of FIG. 1.
Figure 8:
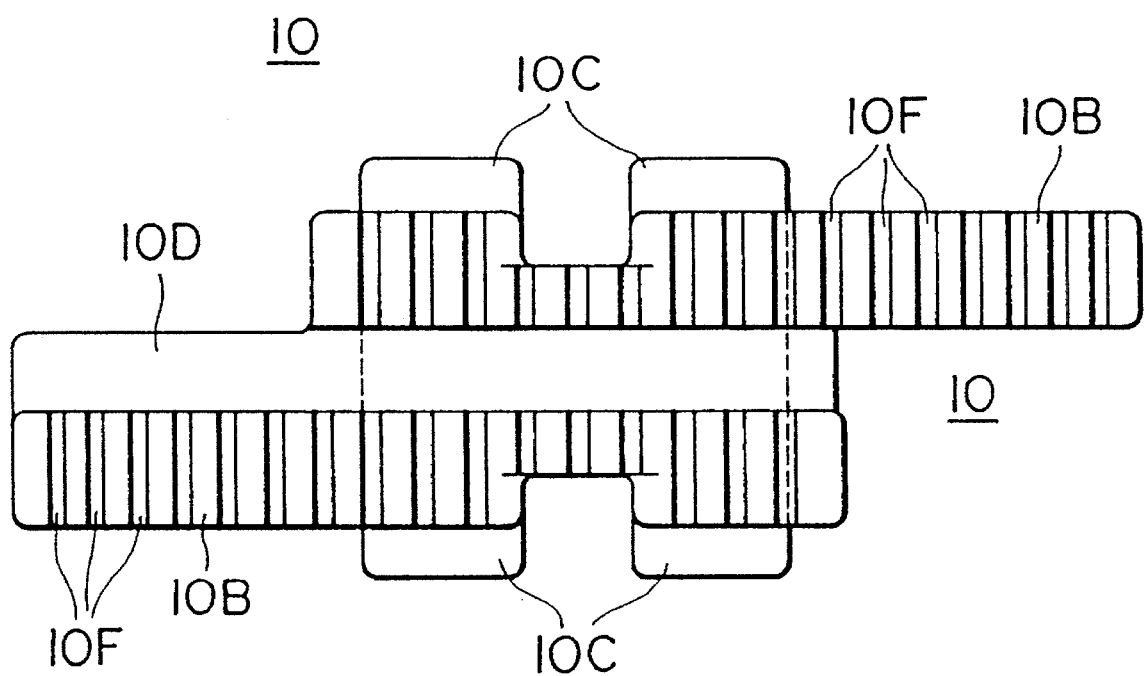
FIG. 8 is a plan view of the slider of FIG. 7.

As shown in FIGS. 7 and 8, the sliders 10 each include a shaft portion 10A, an outer peripheral surface portion 10B of the roller, a projecting portion 10C and a recessed portion or groove 10D.

Also, each slider 10 may be molded by resin material such as an FRP into a desired configuration. Where heat-resistance is required, it may be a metallic material so as to be formed by die-casting or a casting method.

Further, the arc-shaped outer peripheral surface portions 10B of the roller provided to form the outer peripheral surface of the roller at one end side of the shaft 10A are arranged point-symmetrically by putting the recess 10D between them.

By arranging the arc portions point-symmetrically and shifting them at a predetermined distance, when four sliders 10 are disposed at four positions thereof as arranged radially by every 90 degrees, a mutual interference of the arc portions is effectively prevented and they form a continuous roller peripheral surface when the roller is enlarged in its diameter.

Further, the recesses 10D of the sliders 10 have a rubber ring 11 attached thereto. This rubber ring 11 has a function to urge a plurality of sliders 10 (four as shown in FIG. 2) simultaneously towards the axial center of the roller shaft 4 and to restore it to the original position.

As to means for restoring the sliders 10 to their original positions, the rubber ring 11 may be replaced optionally by any other equivalent means such as means for applying a negative pressure to the afore-mentioned diaphragms 9A or means for bridging a tension coil spring in an annular form.

The high-pressure compressed air is supplied into the cylindrical body portion 9D of the sealing member 9 through a rotary-type air joint 17, a blind hole 15 and a communication hole 16 formed in the roller shaft 4.

Figure 4:
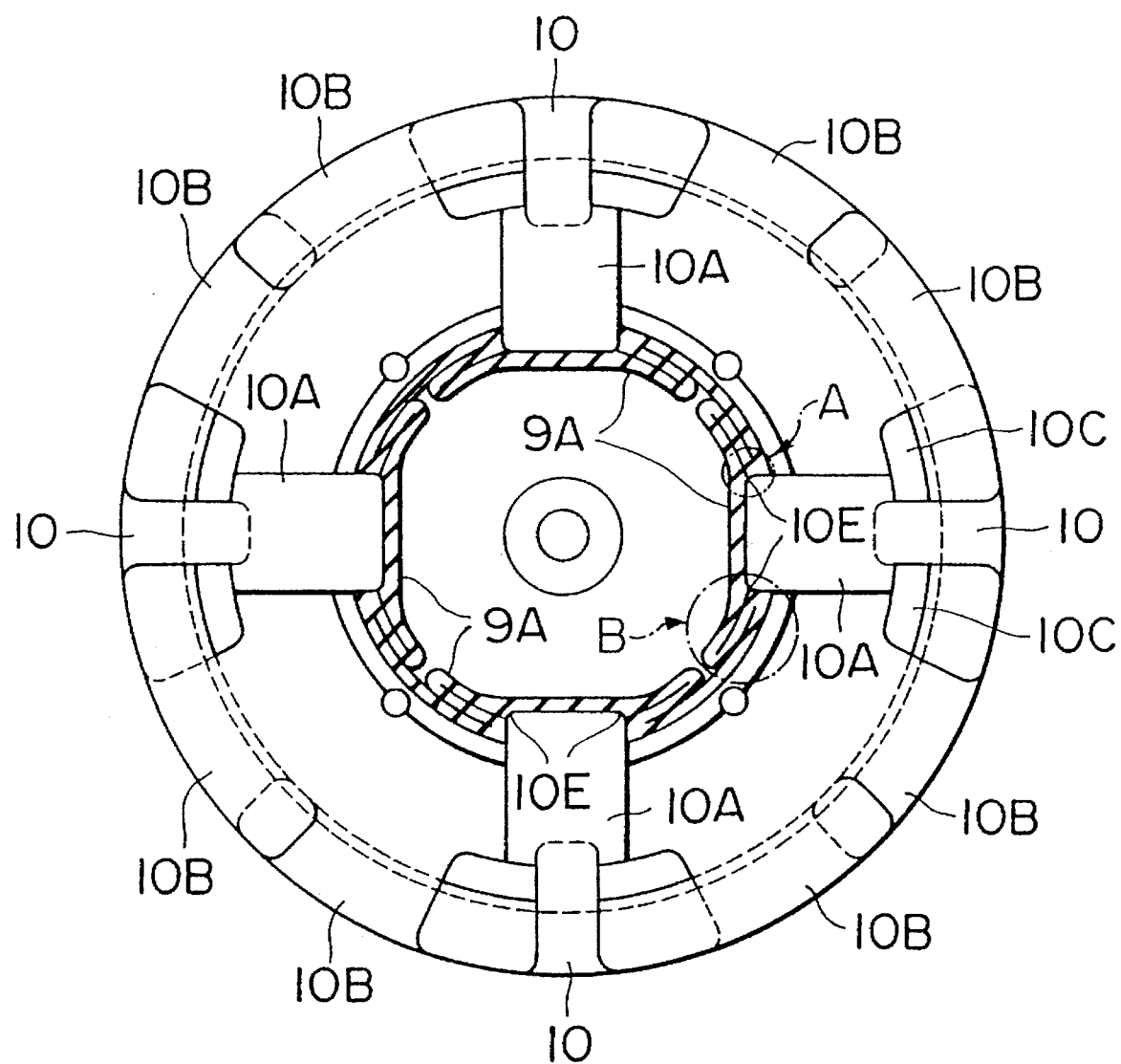
FIG. 4 is a cross-sectional view taken along the line IV—IV of FIG. 3.

By the supply of the high-pressure air, as shown by the arrow B in FIG. 4, the diaphragms 9A of the sealing member 9 are pressed and deformed from the pot-like form into a planar form, thereby urging the sliders 10 outwardly of the pipe 1.

The stroke ends of the sliders 10 provided by the air pressure become an operating limit of the sliders 10 as the projecting portions 10C of the sliders 10 are brought into contact with those U-shaped edge portions 2A and 3A of the side plates 2 and 3 which are bent in a brim form.

Figure 3:
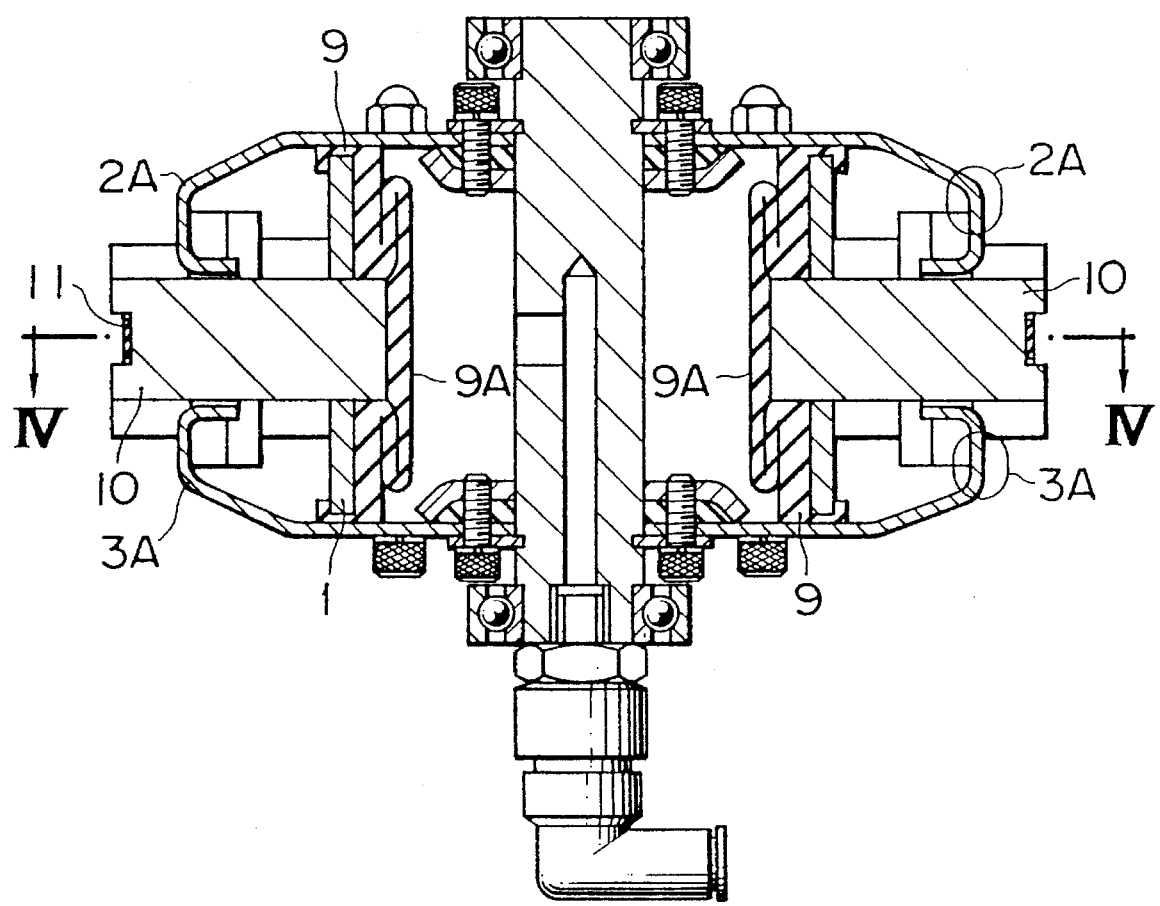
FIG. 3 is a longitudinal-sectional view illustrating the state where compressed air is supplied to the roller of variable outer diameter type.

The sliders 10 pushed outwardly of the pipe 1, as shown in FIGS. 3 and 4, form a predetermined outer peripheral surface (outer diameter size) which is made one size larger. At the same time, naturally, the rubber ring 11 fitted in the recesses 10D of the sliders 10 is enlarged.

Typically, as a conventional cylindrical elastic body made of a rubber material has a pressure resistance of 2 kgf/cm$^2$, it is small in its ability to lift an article for transportation (weight allowance).

In the present invention, in order to secure a transporting ability which is no less than that of a conventional air cylinder, a high-pressure compressed air of more than 5 kgf/cm$^2$ is applied to the diaphragms 9A.

In this case, the afore-mentioned diagrams 9A made of a soft rubber material or the like are deformed into planar forms to come onto an acute edge portion and to be pushed into small gaps. As a consequence, when they are repeatedly pushed intensively into minute gaps of a hard member made of a metal or the like, the soft surfaces of the diaphragms 9A will be separated little by little and eventually their intensity of pressure resistance is so dropped as to cause a fracture.

In order to avoid a rupture or a cracking of the diaphragms 9A repeatedly operated under an high-pressured fluid, according to the present invention the end edge configuration of the supporting shaft 10A is made spherical to provide R-corners 10E as shown in FIG. 7.

Under air-pressure operating conditions, there is provided an arrangement in which as shown by the arrow A in FIG. 4, the portions of deformation of the diaphragms 9A are accepted by the surface of the cylindrical body portion 9D of the sealing member 9 and the R-corners 10E of the supporting shaft 10A to minimize the bending strain and exfoliation of the diaphragms 9A.

By the foregoing arrangements, the diaphragms 9A in accordance with the present invention are made to possess a useful life which withstands a repetitive operation of more than 2,000,000 times under the operating air pressure of no less than 5 kgf/cm$^2$.

As will be described later, after an article is transferred from a first position to a second position by transporting means using rollers of variable outer diameter type as above described, the compressed air which has urged the diaphragms 9A is discharged through the hole 15 in the roller shaft 4 for compressed air supply.

As the air pressure inside the sealing member 9 is reduced, the tension of the rubber ring 11 causes the supporting shaft 10A to urge internally of the pipe 1 so as to restore the initial state as shown in FIGS. 1 and 2. As a result, the outer peripheral surface (outer diameter size) of the roller outer peripheral surface portions 10B is reduced to less than the outer diameter size of the side plates 2 and 3.

Next, a conveyer apparatus and a transferring apparatus constructed by using rollers of variable diameter type 100 as mentioned above will be described hereinafter. Such an apparatus is effective as means for transporting, diverging and joining any articles such as television receivers and semiconductor boards. The conveyer apparatus has the construction provided with a plurality of rotary shaft means having rollers of variable outer diameter type 100 mounted on their shafts. The rotary shafts are driven by motors via a belt, chain or gear transmission.

The transferring apparatus includes a conveyer apparatus provided with a plurality of rotary shaft means having rollers of variable outer diameter type 100 mounted on their shaft portions and another conveyer apparatus additionally provided in the vicinity of the afore-said conveyer apparatus.

For example, any combination is made possible of a conveyer using rollers of variable outer diameter type with a belt conveyer, of a conveyer using rollers of variable outer diameter type with a chain conveyer or of a conveyer using rollers of variable outer diameter type with a roller conveyer including rollers having a small outer diameter.

The transferring apparatus receives predetermined compressed air supplied via the respective roller shafts. As a consequence, the outer diameter size of each roller is enlarged as mentioned above, and the roller shaft 4 supported by ball bearings or the like is rotated by a drive motor and transmission means, such as a chain, so that an article is pushed up (lifted) from the transporting surface of the chain conveyer etc. and transported or diverged in any directions as desired.

After an article is transported or diverged therein, the rollers of variable diameter type 100 are actuated to discharge the compressed air in the sealing member 9 to restore their outer diameter size to the initial state and wait for the next transported articles.

In this way, the roller of variable outer diameter type 100 according to the present invention, by virtue of the fact that it is provided with a sealing member 9 having diaphragms made of an elastic material and a plurality of sliders forming a roller peripheral surface, enables articles to be transported or diverged in an extremely simple construction.

One embodiment of the transferring apparatus using rollers of variable outer diameter type 100 will be described below in further detail with reference to FIGS. 9 and 10.

The transferring apparatus 200 is constructed by a transport conveyer using chains, belts or rollers driven by a motor, as means for entraining and transporting articles, and another conveyer apparatus having a plurality of rotary shaft means with rollers of variable outer diameter type 100 mounted on two positions of their shafts at the two end portions thereof for transporting or diverging the articles.

Figure 9:
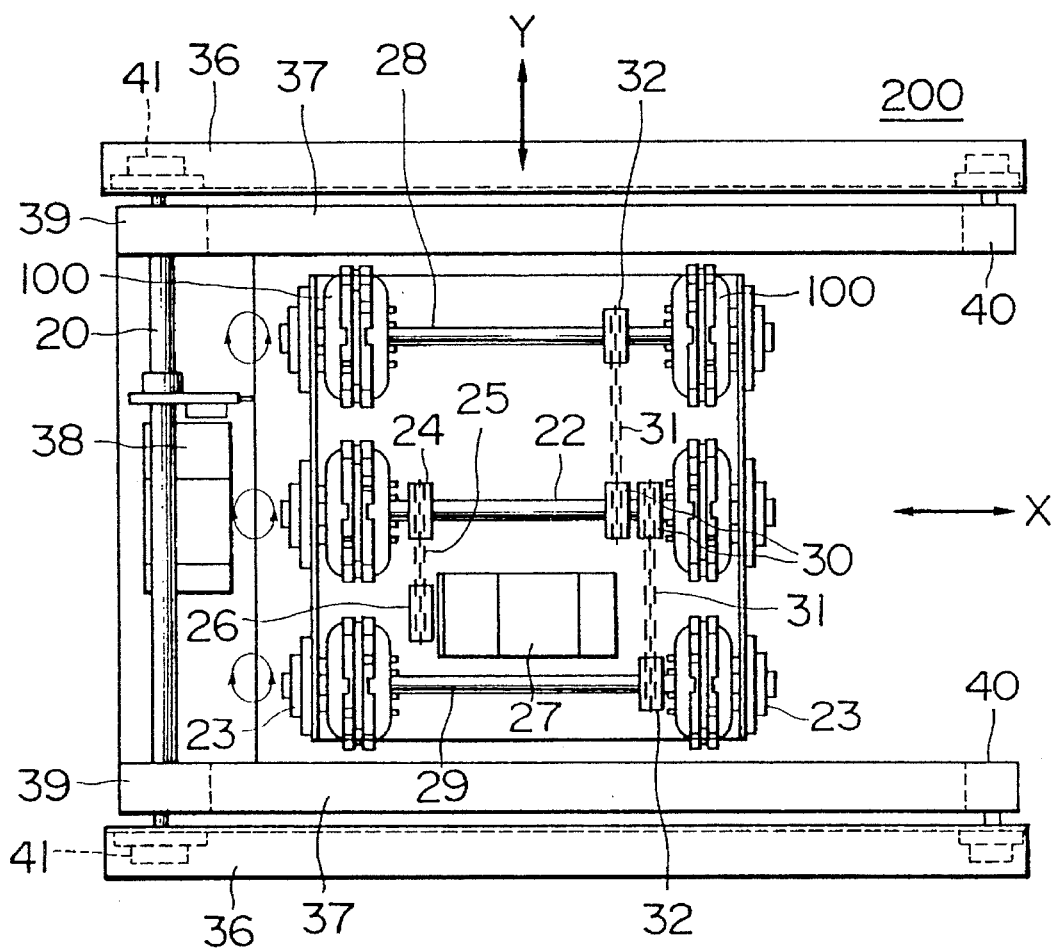
FIG. 9 is a plan view of a transferring apparatus using rollers of variable outer diameter type in accordance with one embodiment of the present invention.

In the case on the apparatus shown in FIG. 9, a pair of transporting belts 37 are arranged at both sides so as to hold therebetween a plurality of rotary shaft means (three as shown for the purpose of convenience) having rollers of variable outer diameter type 100 mounted on their shaft portions.

Also, the direction of advance of the above-mentioned belts 37 and the direction of rotation of the rollers of variable outer diameter type 100 intersect normal to each other.

The drive transmission of rotationally driving the rollers of variable outer diameters type 100 may be performed by way of a belt, pulleys or sprockets, a chain or the like.

The pulleys 39 and 40 are held by bearings (not shown) mounted on a frame 36 and the conveyer belts 37 are driven by the pulleys 39 and 40.

The pulleys 39 and sprockets 41 are secured to the rotary shaft 20. The driving force of a drive motor 38 is transmitted to the sprockets 41 by sprockets 19 and chains 18.

Two rollers of variable outer diameter type 100 are mounted, at each two positions, in both end portions of each of rotary shafts 28, 22 and 29, respectively and are journaled by bearings 23.

In the initial state, i.e. in a state in which the compressed air is discharged and the roller peripheral surface 10B is contracted, the article transporting surface of the rollers of variable outer diameter type 100 is lower in height than the upper surface of the conveyer belt 37. (See height H2 in FIG. 10.)

In an operating state, i.e. in a state in which the compressed air is supplied and the roller peripheral surface 10B is expanded, is at a higher level than the upper surface of the conveyer belt 37. (See height H1 in FIG. 10.)

Figure 10:
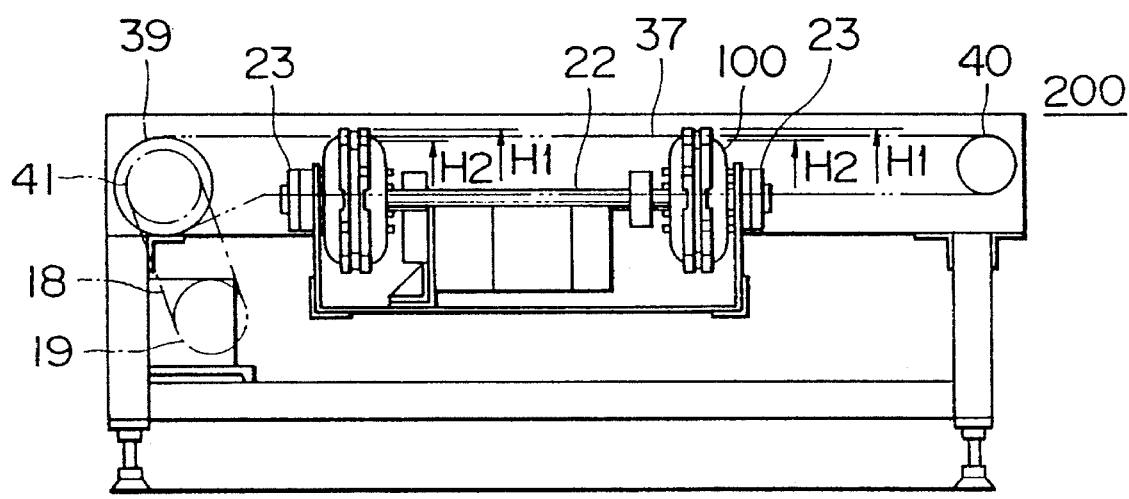
FIG. 10 is an elevational view of the transferring apparatus of FIG. 9.

In the case of a transferring apparatus 200 shown in FIG. 10, the rotary shafts 22, 28 and 29 are arranged parallel to one another.

The rotary shaft 22 receives the driving force of a motor 27 transmitted by way of a connection of sprockets 24 and 26 and a chain 27.

The rotary shafts 28 and 29 receive the driving force of the rotary shaft 22 transmitted by way of sprockets 30 and 32 and a chain 31.

Next, the operation for transferring articles will be explained.

An explanation will be made in the case where an article is received from the direction of arrow Y and transferred (diverged) in the direction of arrow X.

First, compressed air is supplied into the rotary shafts 22, 28 and 29 to cause the rollers of variable outer diameter type 100 to be rotated at the height of H1 while drawing an article from the direction of arrow Y.

Next, after the drawing of the article is completed (or after the article reaches a first position), the rollers of variable outer diameter type 100 will be stopped, and the compressed air is discharged to bring the article to the height of H2 (the outer diameter is reduced), then the article is loaded upon the upper surfaces of the transporting belts 37 to transfer it is the direction of arrow Y (in the direction of a second position) therefrom.

On the other hand, in case an article is transferred from the direction of arrow X to the direction of arrow Y, the rollers of variable outer diameter type 100 stand to wait first at the height of H2.

When the article is placed by the conveyer belts 37 onto the rollers of variable diameter type 100 (the first position), the outer diameter size of the rollers of variable diameter type will be changed to the height of H1 to lift the article from the upper surfaces of the conveyer belts. Thereafter, the rollers of variable outer diameter type 100 are rotationally driven to shift the article in the direction of arrow Y (in the direction of the second position).

In such a manner, the transferring apparatus 200 is capable of transferring an article in a direction perpendicular to the direction of advance of the belt conveyer and this shift can be reversed.

Compared with the construction as in the conventional apparatus in which the entirety of a conveyer apparatus such as a belt conveyer, roller conveyer or chain conveyer is elevated using air-cylinder or the like so as to change the direction of the transportation of an article, the transferring apparatus 200 according to the embodiment of the present invention is extremely simple in structure and can be assembled at low cost.

Furthermore, due to simplicity in construction, the reliability of equipment including such an apparatus has been largely enhanced.

Here, naturally, it is needless to say that a single unit of the afore-mentioned conveyer apparatus using the rollers of variable outer diameter type may be itself used as a conveyer apparatus for transporting articles as in the prior art.

Figure 11:
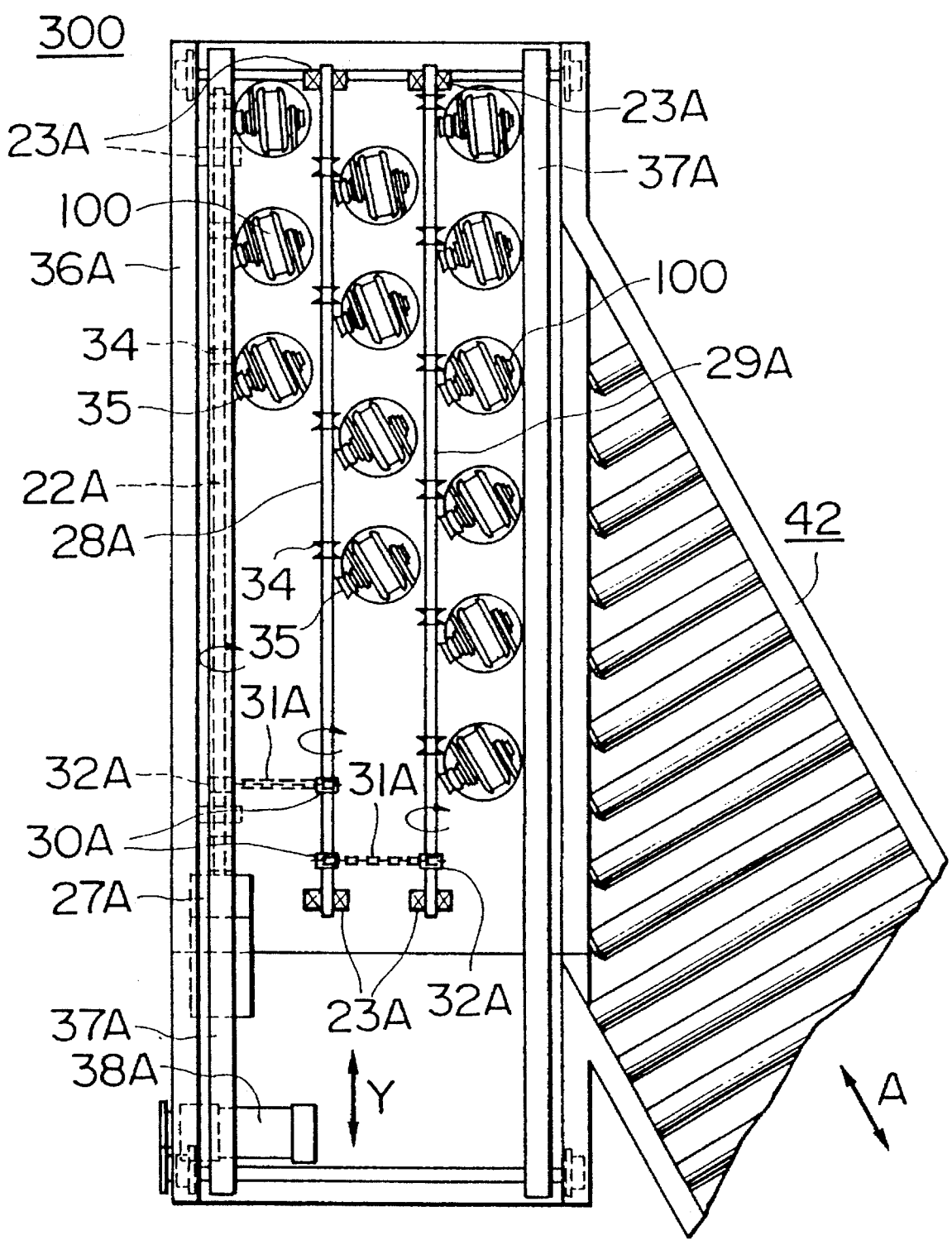
FIG. 11 is a plan view of another transferring apparatus using rollers of variable outer diameter type in accordance with the embodiment of the present invention.

Next, a transferring apparatus 300 according to another embodiment of the present invention in which the number of rollers of variable outer diameter type 100 and the arrangement of rotary shafts are varied is shown in FIG. 11.

In this transferring apparatus, an article can be received from the direction of arrow Y to transfer it in the direction of arrow A, or vice versa.

The transferring apparatus 300 basically includes three transport means, viz. transport belts 37A, a conveyer apparatus having a plurality of rotary shaft means provided with rollers of variable outer diameter type mounted thereon, and a roller conveyer 42 which is separately prepared.

More specifically, it is provided with first conveyer means having three, four and six rollers of variable outer diameters type 100 arranged in three rows, respectively, from the left-hand side. Next, it is provided with second conveyer means including two belt conveyers 37A arranged at both sides in the vicinity of the first conveyer means, and further with the roller conveyer 42 as third conveyer means which intersects at a predetermined angle with the second conveyer means.

In order for an article to be transferred onto the roller conveyer arranged in the direction of arrow A at a predetermined angle or conversely from the roller conveyer, each of the rollers of variable diameter type 100 has the angle of arrangement as gradually varied in such a manner as to be twisted in an arc-like fashion.

Incidentally, the rollers of variable outer diameter type 100 are power-transmitted by pulleys 34 and 35 and a cross-belt (not shown) tensioned between these pulleys from drive shafts 22A, 28A and 29A. Also, one roller of variable outer diameter type 100 is mounted to each rotary shaft at a time and journaled in a predetermined manner thereto by bearing means from both sides thereof.

At this point, it will be needless to say that the cross-belt may be a round belt, a timing belt or any other optional power transmitting means.

As mentioned in the foregoing, the transferring apparatus 200, 300 using rollers of variable outer diameters type in accordance with the present invention is capable of instantaneously lifting an article to be transported by supplying compressed air, so that the direction of transportation can be varied and diverged or joined such that the articles can be transported high speed.

EXAMPLE 2

Another roller of variable outer diameter type 400 according to another embodiment of the present invention will be described with reference to FIGS. 12 to 15.

Compared with the rollers of variable outer diameter type described in Example 1, rollers of variable outer diameter type 400 to be described in Example 2 are so constructed as to omit a sealing member 9 using the diaphragm function.

More specifically, the roller 400 includes a holding member provided with a plurality of through holes radially arranged along a side surface thereof and a fluid-feeding opening communicating with these through holes and sliders respectively fitted slidably in the through holes and forming a roller peripheral surface, wherein the sliders are urged and displaced by a fluid supplied into the fluid-feeding opening in such a direction that the roller outer diameter size is enlarged.

Also, the clearance (interstice size) between each slider and a through hole in which it is slidably fitted is dimensioned to be several tens of µm, and by finishing the fitting state in the order of H7f6 the roller of variable outer diameter type is made compact in structure and small in outer size.

Figure 12:
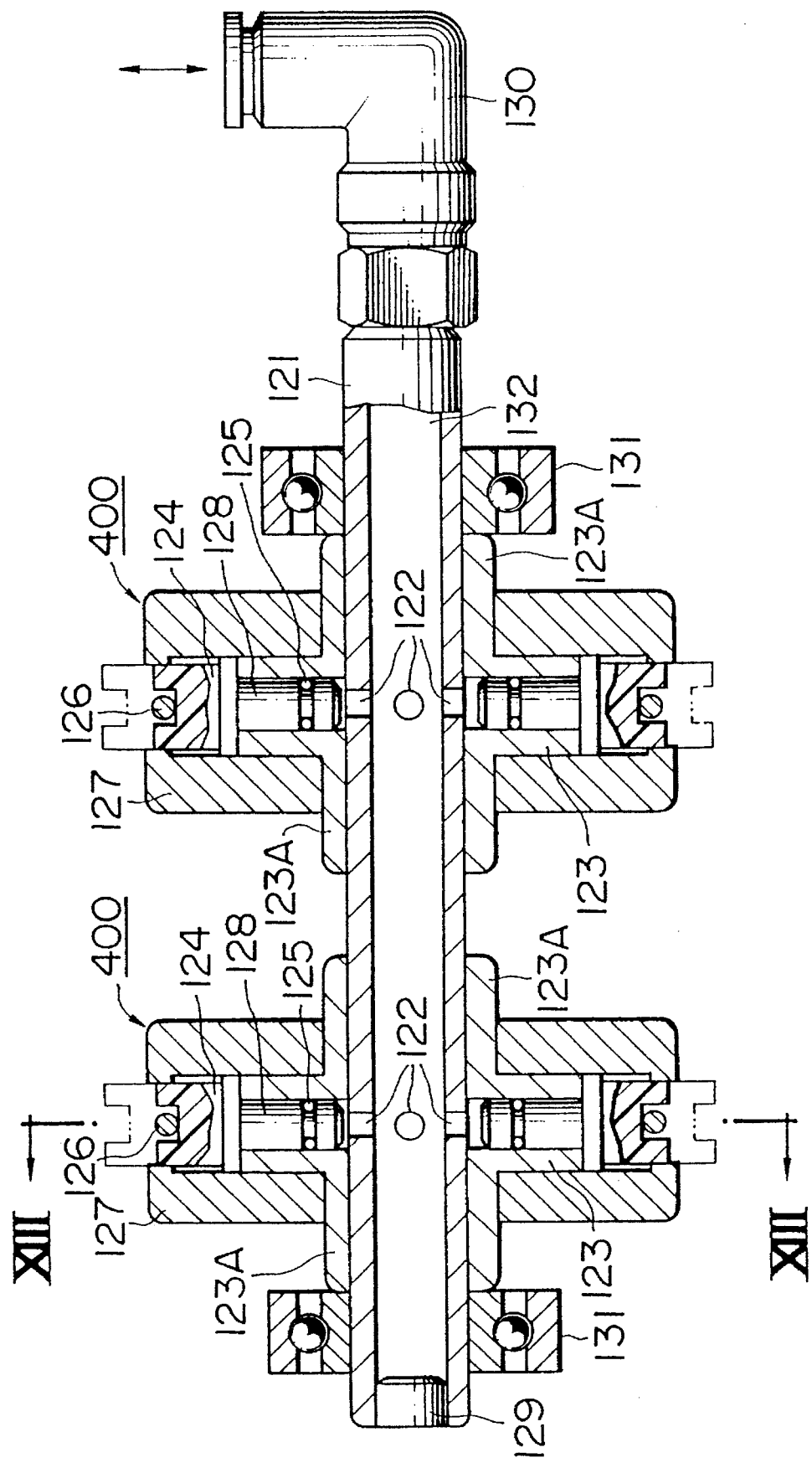
FIG. 12 is a cross-sectional view of another application of the rollers of variable outer diameter type according to the embodiment of the present invention.

FIG. 12 is a cross-sectional view of rollers of variable outer diameter type 400, showing the state of mounting it on a hollow shaft 121.

Figure 13:
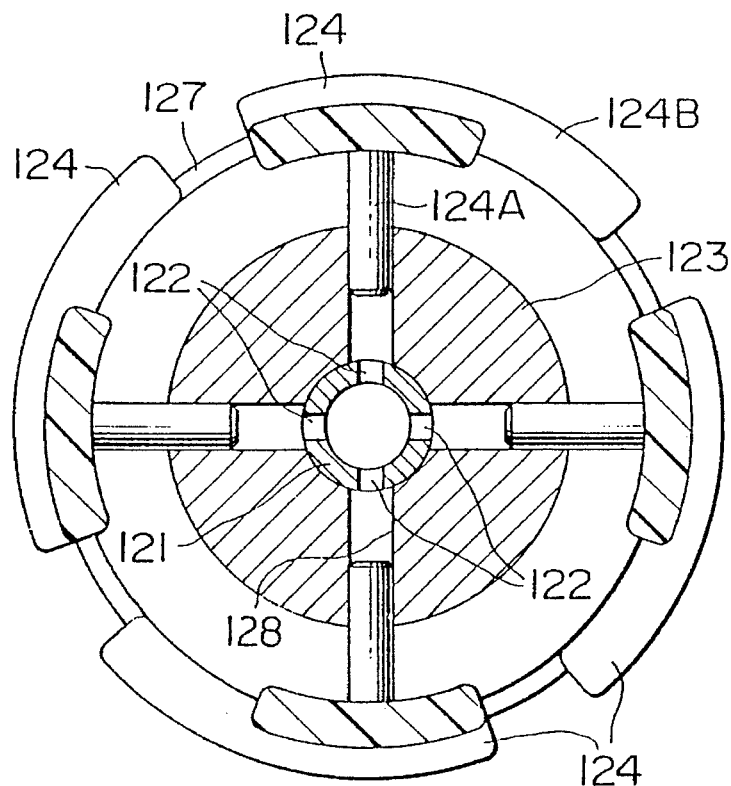
FIG. 13 is a cross-sectional view taken along the line XIII—XIII of FIG. 12.

FIG. 13 is a cross-sectional view taken along the line XIII—XIII in FIG. 12, illustrating the state in which air is supplied in the hollow shaft 121 to enlarge the roller outer diameter. Here, however, "O" rings are omitted as shown.

Figure 14:
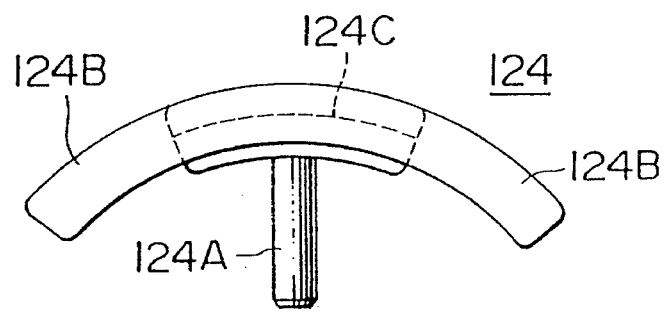
FIG. 14 is an elevational view of a slider included in the roller of variable outer diameter type of FIG. 12.
Figure 15:
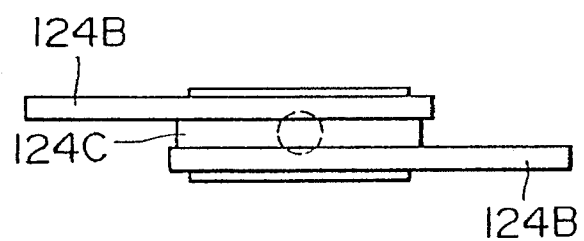
FIG. 15 is a plan view of the slider included in the roller of variable outer diameter type of FIG. 12.

FIG. 14 is an elevational view of a slider 124, and FIG. 15 is a plan view of the slider 124.

First, the hollow shaft 121 is prepared for providing a hollow portion 132 at its axial center for supply of a fluid such as air. This hollow shaft 121 is sealed at its one end with a plug 129 and has its other end provided with a rotary-type air coupling (rotary joint) 130 attached thereto so as to deliver air of a predetermined pressure thereto. Moreover, the hollow shaft 121 is journaled by a pair of bearing at both sides thereof to be spaced by a predetermined distance.

The rotary driving of the hollow shaft 121 is carried out by a drive motor, a pulley and belt means; a drive motor, sprockets and a chain; a drive motor and gear transmission means or the like (all not shown).

Further, the hollow shaft 121 is provided at two sites in the vicinity of the bearings 131 with four through holes (eight in total) radially arranged by every 90 degrees along a side surface thereof which communicate with the hollow portion 132.

The hollow shaft 121 has a disk body 123 securely mounted thereon as members for retaining sliders 124 as will later be described. FIG. 12 shows the state in which they are mounted at two sites.

Each disk body 123 has four perforated openings or through holes 128 radially arranged corresponding to the through holes 122 with each hole communicating with each other.

Furthermore, in each through hole 128 of the disk body 123, there is slidably fitted a slider 124. In the embodiment of FIG. 12, one disk body 123 is provided with four sliders 124 fitted in the through hole 128.

Each slider 124 includes a supporting shaft 124A and outer peripheral surface portions 124B of the rollers as well as in the Embodiment 1. Its detailed configuration is shown in FIG. 14.

The shaft 124A is fitted in the corresponding through hole 128 with a predetermined clearance (interstice size) in the state of a fit of H7f6. It is provided at one or two sites (one site in FIG. 12) with "O" rings 125 in its outer peripheral portion to prevent air leakage and to ensure it will be dust proof. As a matter of course, the shaft 124A is surface-finished by a lathe or grinder to the extent that it has a mirror state or a nearly mirror state. When the slider is resin-molded, however, its surface finish is made unnecessary by improving the surface roughness of the mold used.

The roller outer peripheral surface portions 124B, which hold recess 124C between them, are arc-shaped and arranged point-symmetrically so as to form a roller outer peripheral surface of a predetermined angle (roller outer diameter).

By arranging the arc-like portions 124B so that they are deviated by a predetermined distance point-symmetrically, where the sliders 124 are arranged radially at four sites every 90 degrees, the arc portions 124B are prevented from mutually interfering with each other, thereby continuing to form a continuous roller outer peripheral surface when the roller diameter is enlarged.

The surface configuration of the roller peripheral surface may be set as desired. It may be smooth as shown in FIGS. 13 and 14 or alternatively may be corrugated, as shown in FIGS. 7 and 8, so that it has U- or V-shaped shallow grooves 10F which are formed with a predetermined distance substantially over an entire surface thereof. Of course, it may be knurled by grooves 10F crossing with one another.

Further, the roller outer peripheral surface portion may be optional also in its cross-section. It may be a U-shaped recess 124C formed as a substantial -shaped as shown in FIG. 12 or otherwise may be set to be V-, U- or spherical-shaped depending upon a particular need.

The annular recess or groove 124C is provided with a ring-shaped tension coil spring 126 corresponding to the rubber ring 11 in Example 1 so as to be fitted thereinto.

The function of the ring-shaped tension coil spring 126 is, as described in Example 1, to restore the sliders 124 to the initial state, i.e. to the state in which the outer diameter size of the roller is the smaller original size.

The disk body 123 has side plates 127 respectively arranged at its both side surfaces. The side plates 127 serve to regulate (limit) the stroke ends of the sliders 124 while preventing rotation of their supporting shaft.

More specifically, in case that air of a predetermined pressure is supplied into the through holes 128, the side plates 127 regulate the maximum outer diameter of the roller outer peripheral surface formed by the sliders 124 and prevent the sliders 124 from falling out of the through holes 128.

The roller of variable outer diameter type 400 with the foregoing construction is caused to enlarge its roller diameter by the air supplied through the afore-mentioned rotary-type air coupling (rotary joint) 130. Conversely, the air is discharged to reduce the roller outer diameter size to its initial small size. In this case, the speed of response of the sliders 124 for the air ranges from several tens of msec to several hundred msec and hence is extremely fast.

Of course, needless to say, a speed controller designed to control the speeds of air inflow and outflow may jointly be utilized.

Incidentally, in FIG. 12, the position of the slider shown by two-dot chain lines represents the state in which they are actuated by the air to enlarge the roller outer diameter.

While in the foregoing embodiment described in connection with FIG. 12, two rollers of variable outer diameter type 400 are arranged for the hollow shaft 121, it is needless to say that the number and the sites of mounting of the rollers of variable outer diameter type 400 is optionally set and may be varied as desired.

Further, the configuration and the combined structure of the disk bodies 123, the side plates 127 and the hollow shaft may optionally be varied.

Figure 16:
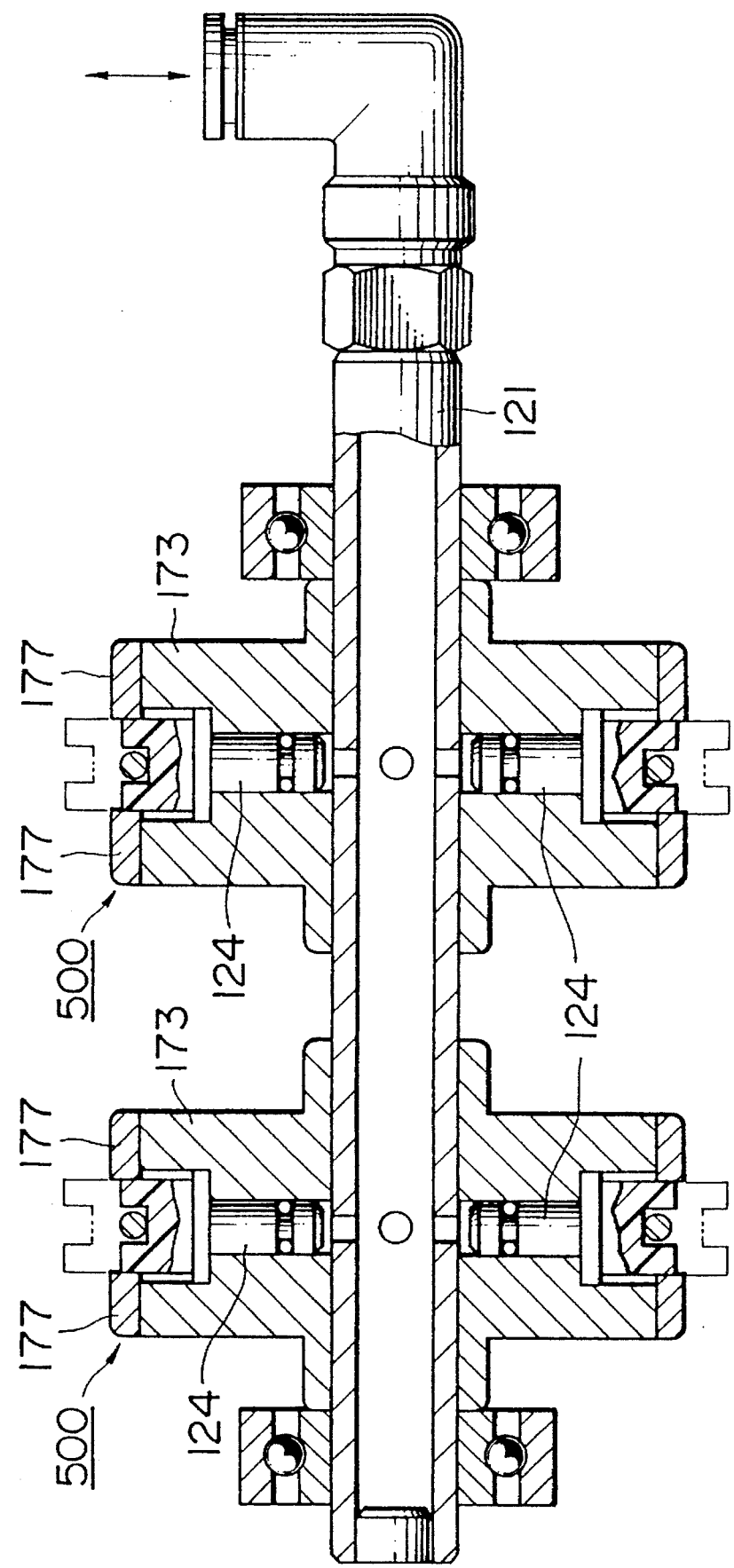
FIG. 16 is a cross-sectional view of still another application of the rollers of variable outer diameter type in accordance with an embodiment of the present invention.

For example, as in rollers of variable outer diameter type 500 shown in FIG. 16, the disk bodies and side plates may be integrated to form members that constitute holding members 173 and the stroke ends of the sliders 124 may be regulated by stoppers 177.

Figure 17:
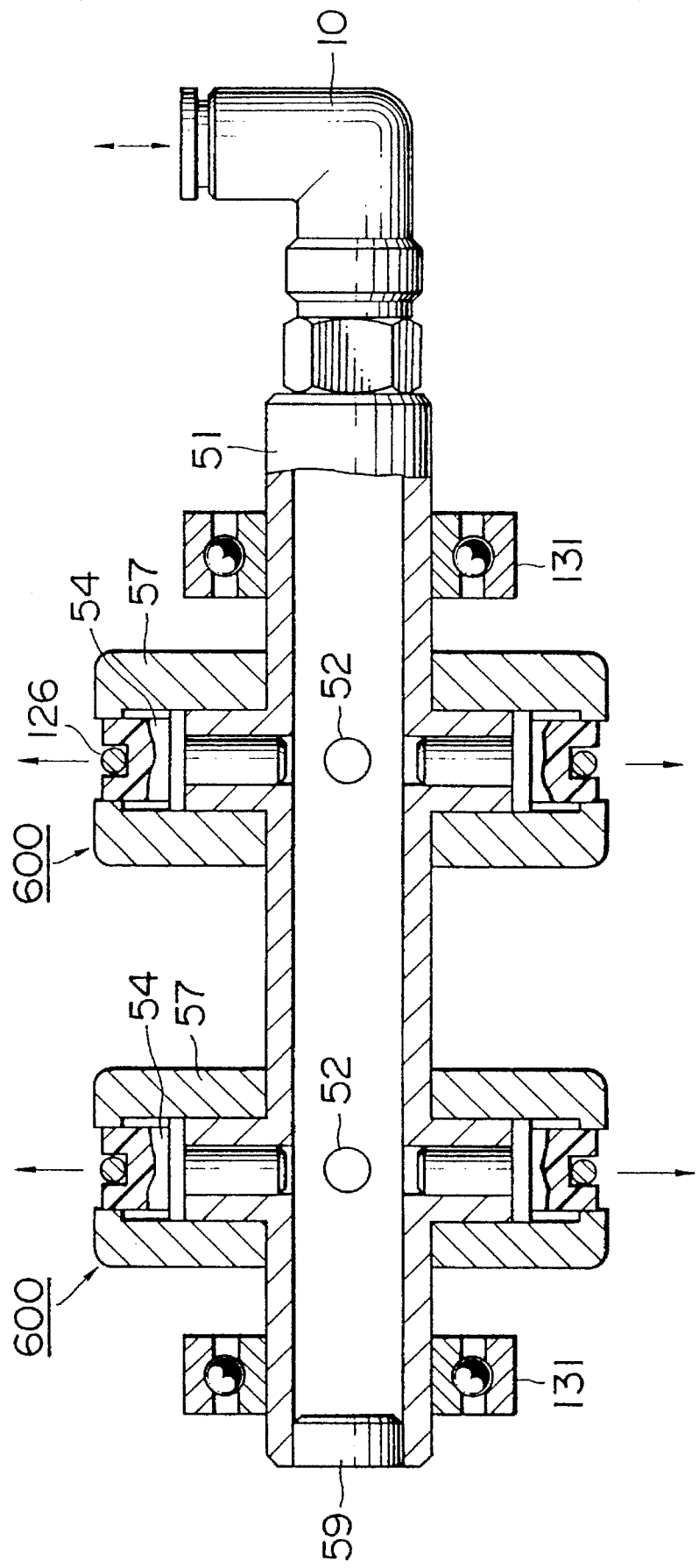
FIG. 17 is a cross-sectional view of yet another application of the rollers of variable outer diameter type in accordance with an embodiment of the present invention.
Figure 18:
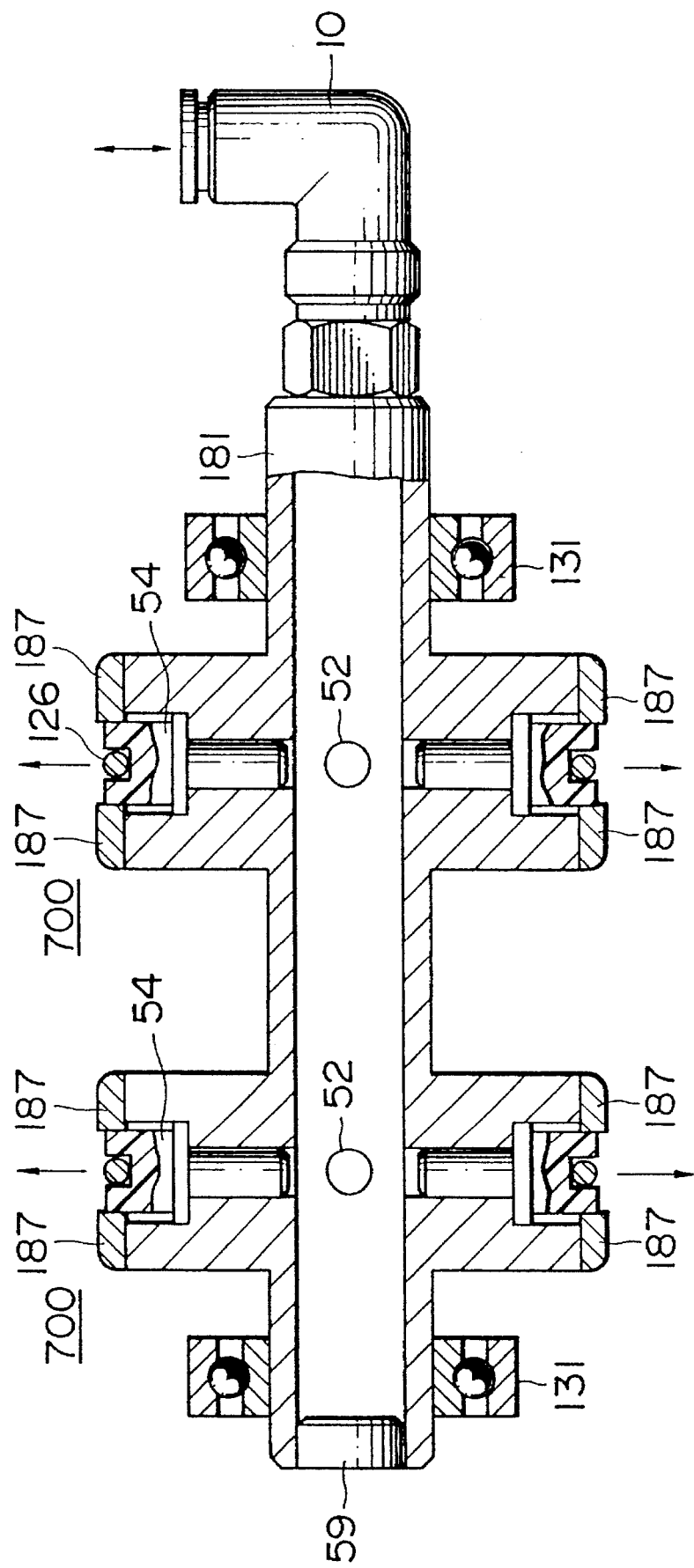
FIG. 18 is a cross-sectional view of further application of the rollers of variable outer diameter type in accordance with an embodiment of the present invention.

Further, as in rollers of variable outer diameter type 600 shown in FIG. 17, the disk bodies and the hollow shaft in FIG. 12 may be integrated to hold sliders, and as in rollers of variable outer diameter type 700 shown in FIG. 18, the disk bodies, the hollow shaft and the side plates may be integrated to each other. Any of such modifications may possibly be adopted as desired.

Also, in FIG. 16, in lieu of stoppers 177 for regulating the movements of the sliders 124, pins may be projected from the holding members to restrict those movements laterally of the shafts and the roller outer peripheral surface portions. (not shown)

More specifically, a roller of variable outer diameter type may be constructed that includes a holding member provided with a plurality of through holes radially arranged along a surface thereof and a fluid-feeding opening communicating with these through holes; and sliders respectively fitted slidably in the through holes and forming a roller outer periphral surface, wherein the sliders are urged or displaced by a fluid supplied in the fluid-feeding opening in such a direction that the roller outer diameter size is enlarged.

Furthermore, the disk bodies, the side plates, the hollow shaft and the holding member formed by integrating these components may optionally be altered in their structural components and their machining means, and may be made of polystyrene resin material (PS), epoxy resin material or FRP which may be resin-molded.

The description of a conveyer apparatus or transferring apparatus constructed using the rollers of variable outer diameter type 400, 500, 600 or 700 described in Example 2 is omitted for the reason that they may be substituted for rollers of variable outer diameter type 100 described in Example 1 to build up a similar construction.

As described in the foregoing, according to a roller of variable outer diameter type of the present invention, the roller outer peripheral size (outer diameter size) can be instantaneously altered with stability in a simple structure without necessitating a precision-machined part, even with such a high pressure fluid as may vary from 5 Kgf/cm$^2$ to 8 kgf/cm$^2$ in pressure magnitude. Also, the life of repetition and the reliability are markedly improved.

Further, in the construction of not using a diaphragm, the outer configuration size can be reduced and the construction can be further simplified.

Furthermore, in a conveyer apparatus or transferring apparatus for articles using the rollers of variable outer diameter type according to the present invention, the cost of manufacture is largely reduced, and the apparatus are extremely made compact and light-weighted, also enabling a diverging or joining operation for articles to be carried out at an increased speed in transporting equipment and permitting expanded use of the roller and apparatus. Thus, plenty of advantageous effects are attainable in accordance with the present invention.

What is claimed is:

1. An apparatus for transferring articles, comprising:

(a) a plurality of rotary shaft means having rollers of variable outer diameter type mounted on a shaft portion of said rotary shaft means;

(b) individual ones of said rollers comprising:

a holding member having a plurality of through holes radially arranged in a side surface thereof and a hollow portion communicating with said through holes;

a sealing member mounted in said hollow portion and provided with diaphragms corresponding to each of said through holes;

sliders fitted to slide in each of said through holes and providing a roller peripheral surface; and said diaphragms of said sealing member urging, responsive to fluid supplied into the hollow portion thereof, said sliders to displace in a direction such that an outer diameter size of the roller is enlarged;

(c) a pair of transporting conveyers arranged at both ends of said rotary shaft means so as to hold it therebetween; and (d) a third conveyer means provided so as to intersect with said transporting conveyers at a predetermined angle thereto.

2. An apparatus for transferring articles as set forth in claim 1, wherein said third conveyer means is a roller conveyer.

3. An apparatus for transferring articles as set forth in claim 1, wherein at least one of said rollers of variable outer diameter type is oriented at an orientation angle, relative to a longitudinal direction of said pair of conveyers, which is different from an orientation angle, relative to said longitudinal direction of said pair of conveyers, of at least one other of the rollers.

4. A roller of variable outer diameter type, comprising:

a holding member having a plurality of through holes radially arranged along a side surface thereof and provided with a fluid supply opening communicating with said through holes; and sliders respectively fitted to slide in said through holes and forming a roller peripheral surface;

said sliders being urged by a fluid supplied to said fluid supply opening to be displaced in a direction such that an outer diameter size of the roller is enlarged.

5. A conveyor apparatus comprising a plurality of rotary shaft means including a plurality of rollers of variable outer diameter type mounted on said plurality of rotary shaft means, individual ones of said rollers comprising a holding member having a plurality of through holes radially arranged along a side surface thereof and provided with a fluid supply opening communicating with said through holes; and sliders respectively fitted to slide in said through holes and forming a roller peripheral surface;

said sliders being urged by a fluid supplied to said fluid supply opening to be displaced in a direction such that an outer diameter of size of the roller is enlarged.

6. An apparatus for transferring articles comprising:

a plurality of rotary shaft means having rollers of variable outer diameter type mounted thereon, individual ones of said rollers comprising a holding member having a plurality of through holes radially arranged along a side surface thereof and provided with a fluid supply opening communicating with said through holes; and sliders respectively fitted to slide in said through holes and forming a roller peripheral surface;

said sliders being urged by a fluid supplied to said fluid supply opening to be displaced in a direction such that an outer diameter of size of the roller is enlarged; and conveyer means arranged in the vicinity of said rotary shaft means.

7. An apparatus for transferring articles as set forth in claim 6, wherein said conveyer means, arranged in the vicinity of said rotary shaft means, comprises at least one of a belt conveyer, a chain conveyer or a roller conveyer.

8. A roller of variable outer diameter type, comprising:

a holding member having a plurality of through holes arranged radially along a side surface thereof and provided with a fluid supply opening communicating with said through holes;

sliders respectively fitted slidably in said through holes and forming a peripheral surface of the roller;

said sliders being urged and displaced by a fluid supplied in said fluid supply opening in such a direction that an outer diameter size of the roller is enlarged; and a member for restricting an operating range of said sliders.

9. A roller of variable outer diameter type, comprising:

a disk body having a plurality of through holes radially arranged along a side surface thereof and provided with a fluid supply opening communicating with said through holes;

sliders respectively fitted slidably in said through holes and forming an outer peripheral surface of the roller;

said sliders being urged and displaced by a fluid supplied in said fluid supply opening in such a direction that an outer diameter size of the roller is enlarged; and a side plate arranged at a side surface of said disk body.

10. A roller of variable outer diameter type, comprising:

a hollow shaft provided with a plurality of through holes radially arranged along a cylindrical surface thereof:

sliders respectively fitted slidably in said through holes and forming an outer peripheral surface of the roller;

said sliders being urged and displaced by a fluid supplied in said hollow shaft in such a direction that an outer diameter size of the roller is enlarged; and a member for restricting an operating range of said sliders.

11. A roller of variable outer diameter type, comprising:

a hollow shaft having a plurality of through holes radially arranged along a cylindrical surface thereof;

sliders respectively fitted slidably in said through holes and forming an outer peripheral surface of the roller;

said sliders being urged and displaced by a fluid supplied in said hollow shaft in such a direction that an outer diameter size of the roller is enlarged; and a side plate mounted to said hollow shaft.

* * * * *